(12) United States Patent
Ito et al.

(10) Patent No.: US 7,861,564 B2
(45) Date of Patent: Jan. 4, 2011

(54) SLOT DEVICE

(75) Inventors: Yoshinori Ito, Aichi (JP); Shozo Kito, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 1413 days.

(21) Appl. No.: 11/314,907

(22) Filed: Dec. 21, 2005

(65) Prior Publication Data

US 2006/0139146 A1    Jun. 29, 2006

(30) Foreign Application Priority Data

Dec. 27, 2004    (JP)    .............................. 2004-377304

(51) Int. Cl.
*B60R 25/02*    (2006.01)

(52) U.S. Cl. .......................... 70/252; 70/278.2; 70/388; 70/414; 70/427; 70/455; 267/169; 307/10.5; 307/10.6

(58) Field of Classification Search .................. 70/252, 70/423–428, 455, 388, 414, 453, 454, DIG. 51, 70/491, 496, 182–186, 278.2, 278.3, 278.7, 70/345, 387, 413, DIG. 30, 429, 389, 390; 267/166, 169, 170, 179; 174/67; 439/135, 439/136, 140, 141; 307/10.3, 10.5, 10.6; 340/5.72, 5.31, 5.67, 426.11, 426.3
See application file for complete search history.

(56) References Cited

U.S. PATENT DOCUMENTS

| | | | | |
|---|---|---|---|---|
| 1,404,464 A | * | 1/1922 | Meyer | ......................... 267/290 |
| 1,946,722 A | * | 2/1934 | Thompson | ................... 70/388 |
| 2,000,905 A | * | 5/1935 | Rockefeller, Jr. | ............. 267/157 |
| 3,552,160 A | * | 1/1971 | Kleebauer | ..................... 70/388 |
| 6,776,016 B1 | * | 8/2004 | Wittwer et al. | ................. 70/252 |
| 6,803,675 B2 | * | 10/2004 | Harada et al. | .............. 307/10.3 |
| 7,249,757 B2 | * | 7/2007 | Ozawa et al. | ............... 267/196 |
| 7,392,675 B2 | * | 7/2008 | Kito | ............................. 70/252 |
| 2003/0111781 A1 | * | 6/2003 | Imaizumi | ..................... 267/166 |

FOREIGN PATENT DOCUMENTS

| | | |
|---|---|---|
| EP | 1 418 532 A2 | 5/2004 |
| JP | 2004-58731 A | 2/2004 |

* cited by examiner

*Primary Examiner*—Lloyd A Gall
(74) *Attorney, Agent, or Firm*—Seager, Tufte & Wickhem, LLC (57) ABSTRACT

A slot device for holding a portable device that communicates with a controller installed in a vehicle. The slot device includes a retainer for retaining the portable device, a shutter for closing the retainer, and a spring received in a spring receptacle for urging the shutter to close the retainer. The spring is supported in an inclined state to contact the inner surface of the spring receptacle and prevent vibrations and noise.

16 Claims, 6 Drawing Sheets

SLOT DEVICE

BACKGROUND OF THE INVENTION

The present invention relates to a slot device for installation in a vehicle.

Electronic key systems are used in recent vehicles for anti-theft purposes. A typical electronic key system includes a portable device held by a user (e.g., the driver) and a controller installed in a vehicle. If communication (wide area communication) is established with wireless signals between the portable device and the controller when the user enters the vehicle while holding the portable device, the electronic key system enables starting of the engine. More specifically, an ID code of the portable device is compared with an ID code of the controller. When the two ID codes are identical, the controller enables starting of the engine.

The portable device includes a communication circuit for communicating with the controller and a battery for supplying the communication circuit with power. To enable communication between the controller and the communication circuit when battery drainage occurs, the portable device further includes a transponder. The transponder is activated by electromagnetic energy, which is generated by a wireless signal transmitted from the controller, to transmit an ID signal, which includes an ID code, and enable communication (narrow area communication) in an area narrower than the area in which wide area communication is performed.

A slot device is arranged near the driver seat in the vehicle. The controller outputs the wireless signal when the portable device is inserted in the slot device. Thus, when battery drainage occurs in the portable device, the portable device is inserted in the slot device to activate the transponder and enable communication between the portable device and the controller. Japanese Laid-Open Patent Publication No. 2004-058731 describes such a slot device.

The slot device includes a case, which has an opening, and a shutter, which covers the opening of the case. The shutter is movable along the inner surface of the case. A cylindrical spring receptacle, which has an open end, projects from the inner surface of the shutter. The spring receptacle receives and supports one end of a coil spring. The other end of the coil spring is received and supported by a guide, which projects from the surface of the case facing toward the shutter. Thus, when inserting the portable device in the case, the shutter moves inwardly into the case with the portable device against the urging force of the coil spring. When the portable device is removed from the case, the urging force of the coil spring returns the shutter to the position where it closes the opening. A stopper is arranged at the inner side of the opening. The shutter abuts against the stopper when closing the opening. In this state, the shutter is flush with the outer surface of the case around the opening.

To smoothly compress and expand the spring, a clearance (gap) is provided between the outer surface of the spring and the inner surface of the spring receptacle. However, if the slot device is located, for example, near the gearshift lever, vibrations produced when shifting the gearshift lever may be transmitted to the coil spring. In this state, if the portable device is not inserted in the slot device, this may produce noise (rattling).

To prevent the coil spring from being vibrated by externally transmitted vibrations, for example, the spring force (urging force) of the coil spring may be increased. As a result, the two ends of the coil spring would apply a strong force to the opposing surfaces of the spring receptacle and the case. This would prevent the coil spring from vibrating. However, a strong force would be required to insert the portable device in the slot device. Further, this may cause the portable device to pop out of the slot device during removal and affect the convenience of the slot device.

To prevent the coil spring from vibrating without increasing the force of the coil spring, grease may be applied to the coil spring. This would cause the coil spring to be viscid and prevent the coil spring from vibrating. However, when inserting the portable device in the slot device, grease may stick to the portable device. Normally, the user would remove the portable device from the slot device when leaving the vehicle. The user may then put the portable device into a clothing pocket or a bag. As a result, the grease may stain the user's clothing or bag or cause the portable device to slip in the user's hand. This would affect the convenience of the slot device.

SUMMARY OF THE INVENTION

The present invention provides a slot device that prevents the spring from vibrating and causing noise without affecting the convenience of the slot device.

One aspect of the present invention is a slot device for holding a portable device. The portable device is for performing predetermined communication with a controller installed in a vehicle and enabling activation of a drive source. The slot device includes a retainer for retaining the portable device. The retainer includes an opening, through which the portable device is insertable, and an inner bottom surface. A shutter, movable in the retainer, opens and closes the opening of the retainer. A guide is arranged on the inner bottom surface of the retainer. A cylindrical spring receptacle is arranged on the shutter facing toward the guide and including an open distal end, an inner bottom surface facing towards the inner bottom surface of the retainer, and an inner circumferential surface extending between the distal end and the inner bottom surface. A coil spring includes an end supported by the guide and another end supported by the spring receptacle. The coil spring produces urging force for urging the inner bottom surface of the spring receptacle away from the inner bottom surface of the retainer. Insertion of the portable device into the retainer moves the shutter in the insertion direction of the portable device against the urging force of the coil spring. Removal of the portable device from the retainer causes the shutter to move to close the opening of the retainer due to the urging force of the coil spring. A spring elevation seat is arranged on either one of the inner bottom surface of the retainer and the inner bottom surface of the spring receptacle. The spring elevation seat and the associated inner bottom surface on which the spring elevation seat is arranged supports the corresponding end of the coil spring so that the coil spring is inclined relative to the inner bottom surface on which the spring elevation seat is arranged and the coil spring contacts the inner circumferential surface of the spring receptacle.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A slot device 10 according to a preferred embodiment of the present invention will now be described with reference to FIGS. 1 to 5. A portable device 2 is inserted in the slot device 10, which is installed in the passenger compartment of a vehicle.

Figure 1:
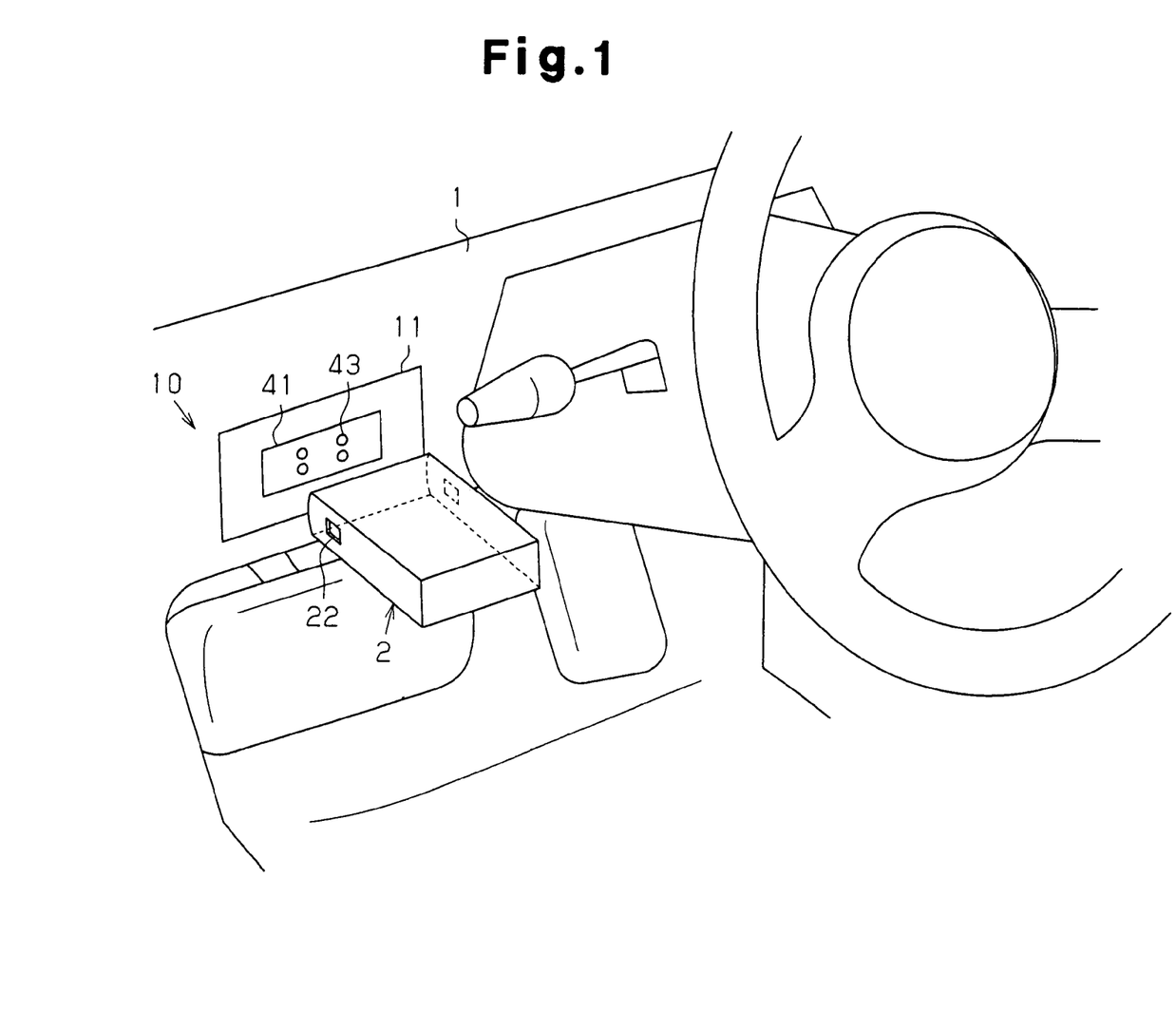
FIG. 1 is a schematic perspective view showing a slot device according to a preferred embodiment of the present invention in a state installed in a passenger compartment.

Referring to FIG. 1, the slot device 10 is arranged in the instrument panel 1 near the driver seat. When necessary, the user inserts the portable device 2 in the slot device 10. The portable device 2 and the slot device 10 will now be described.

The portable device 2 includes a communication circuit and a battery. The communication circuit, which is supplied with power from the battery, communicates with a controller (not shown), which is installed in the vehicle, through wireless signals. In a normal situation when there is no battery drainage, communication (wide area communication) is automatically performed between the portable device 2 and the controller through wireless signals when the user enters the vehicle while holding the portable device 2. When communication is established, the starting of the engine, which functions as a drive source, is enabled.

Figure 2:
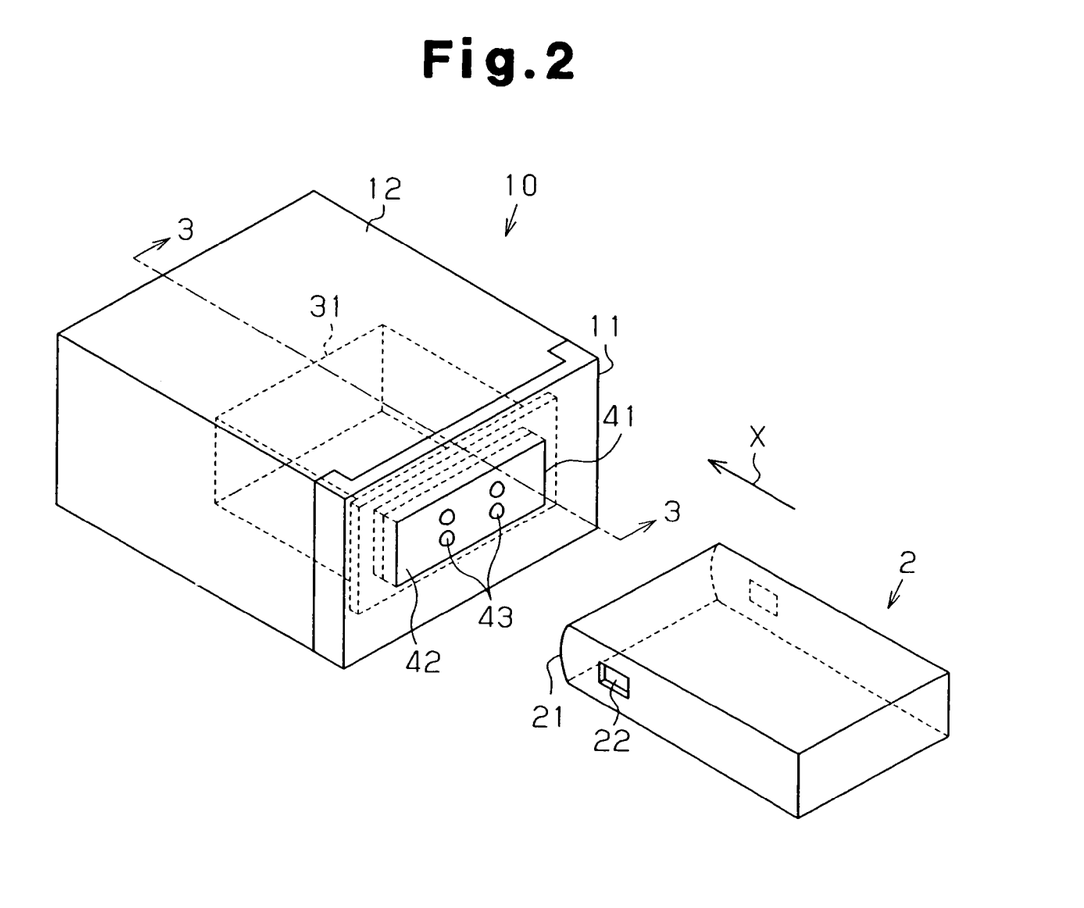
FIG. 2 is a perspective view showing the slot device.

Referring to FIG. 2, the portable device 2 is generally matchbox-shaped. To facilitate insertion into the slot device 10, the portable device 2 is slightly tapered so that it becomes narrower in the direction of insertion. Further, an insertion surface 21, which is defined on the end of the portable device 2 that faces toward the slot device 10 during insertion, is rounded. Opposing side surfaces, which are generally perpendicular to the insertion surface 21, each include an engagement socket 22. The engagement sockets 22 engage locking hooks 15, which are arranged in the slot device 10, when the portable device 2 is inserted in the slot device 10. This holds the portable device 2 in the slot device 10.

Figure 3:
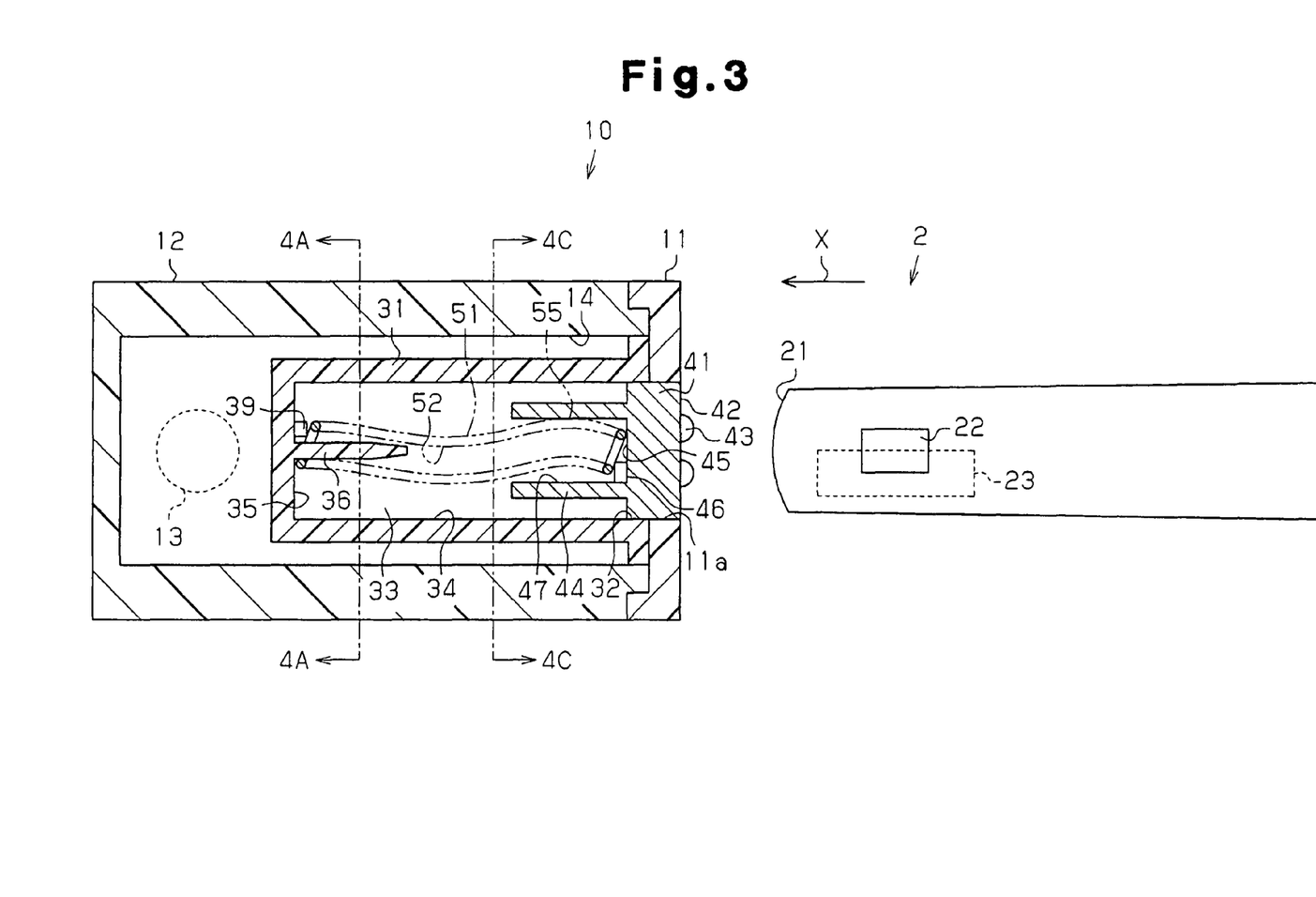
FIG. 3 is a cross-sectional view taken along line 3-3 in FIG. 2.

Referring to FIG. 3, the portable device 2 includes a transponder 23, which enables communication with the controller when, for example, battery drainage occurs. The portable device 2 is inserted in the slot device 10 when battery drainage occurs to generate electromagnetic energy from the wireless signal transmitted from the portable device. This enables communication (narrow area communication) in an area that is narrower than the area in which wide area communication is performed.

The slot device 10 will now be described. The controller outputs a wireless signal when the portable device 2 is inserted in the slot device 10. Thus, when the battery of the portable device 2 is drained, the portable device 2 is inserted in the slot device 10 to activate the transponder 23 and enable communication between the portable device 2 and the controller.

Referring to FIGS. 2 and 3, the slot device 10 includes a cover 11 fixed to the instrument panel 1, a case 12 fixed to the cover 11, a retainer 31 accommodated in the case 12, a shutter 41 accommodated in the retainer 31, and a coil spring 51 for urging the shutter 41 in the closing direction. An immobilizer antenna 13, which is used for communication with the transponder 23, is incorporated in the case 12.

The cover 11 is generally plate-shaped and includes a rectangular insertion hole 11a for insertion of the portable device 2. The cover 11 is flush with the surface of the instrument panel 1.

The case 12, which is box-shaped, has an open end surface into which a rectangular retainer pocket 14 extends. The open end surface of the case 12 is fixed to the inner surface of the cover 11.

The retainer 31, which is box-shaped, has a surface including a rectangular opening 32 into which the portable device 2 is inserted. The walls defining the opening 32 are flush with the walls defining the insertion hole 11a of the cover 11. An accommodation space 33, which the portable device 2 is inserted into through the opening 32, is defined in the retainer 31. The locking hooks 15 (refer to FIG. 5) are arranged on inner side surfaces 34 of the retainer 31. The locking hooks 15 are projectable in cooperation with the movement of the retainer 31.

Referring to FIG. 3, a guide 36 projects from an inner bottom surface 35 of the retainer 31.

Figures 4A, 4B, 4C, 4D:
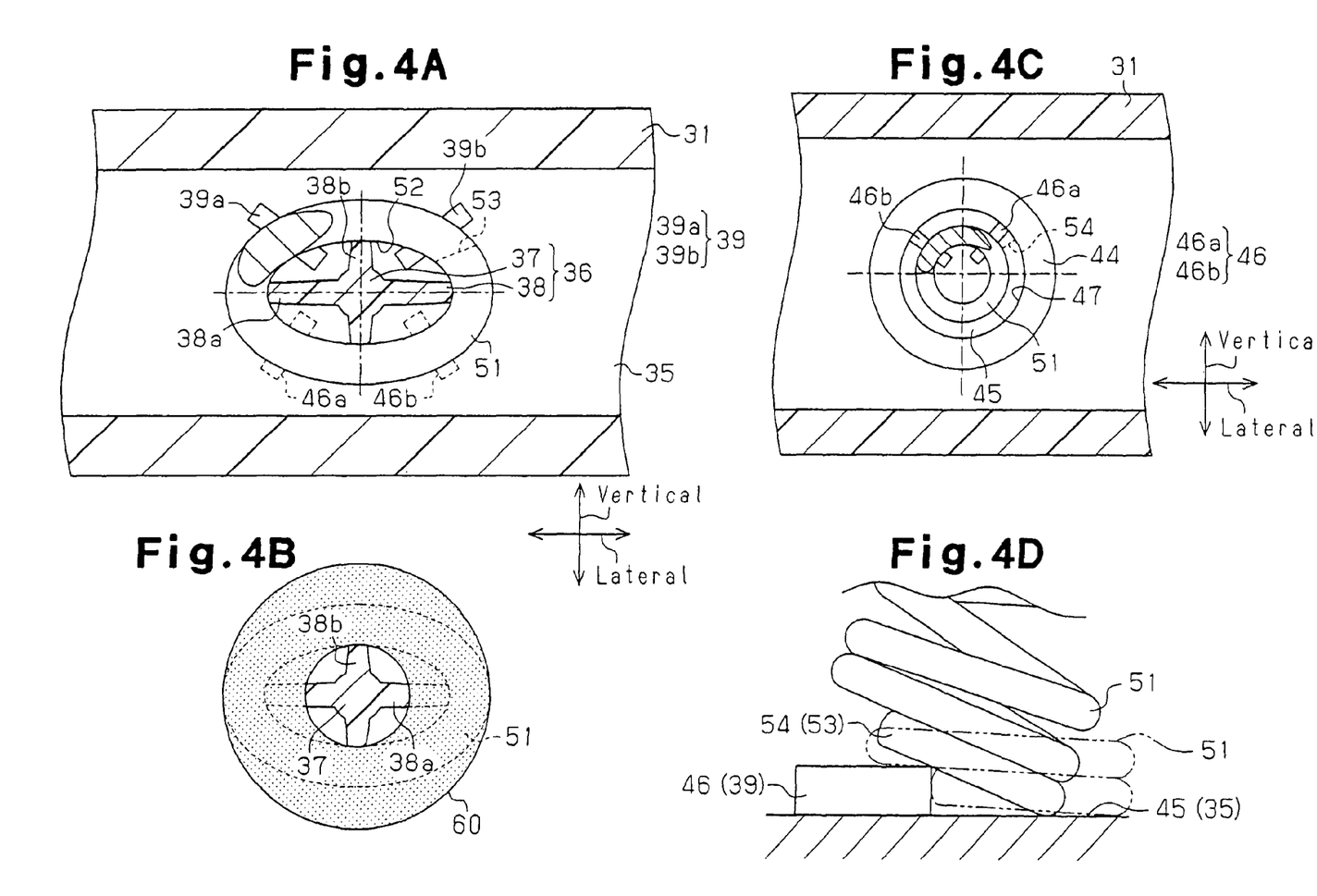
FIG. 4A is a cross-sectional view taken along line 4A-4A in FIG. 3.
FIG. 4B is a schematic diagram of the rotation path of a coil spring shown in FIG. 4A.
FIG. 4C is a cross-sectional view taken along line 4C-4C in FIG. 3.
FIG. 4D is an enlarged view showing the coil spring on a second spring elevation seat.

As shown in FIGS. 3 and 4A, the guide 36 includes a rod 37 and a support 38. The rod 37 is cylindrical and extends from the middle of the inner bottom surface 35 of the retainer 31 towards the opening 32. The support 38 is formed integrally with the surface of the rod 37. The support 38 includes a plurality of first fins 38a (two in this embodiment) and a plurality of second fins 38b (two in this embodiment). In this embodiment, the first and second fins 38a and 38b, which project from the surface of the rod 37, and extend between the basal and distal ends of the rod 37, that is, along the entire length of the rod 37. The first and second fins 38a and 38b may be formed to extend from the basal end to only the middle portion of the rod 37 instead of the distal end.

The two fins 38a are formed on opposite sides of the rod 37 with an angular interval of 180 degrees between each other and extend in the lateral direction of the opening 32, as viewed in FIG. 4A. Further, the projected length of the second fins 38b from the surface of the rod 37 is less than that of the first fins 38a. The second fins 38b are formed on opposite sides of the rod 37 with an angular interval of 180 degrees between each other and extend in the vertical direction of the opening 32 as viewed in FIG. 4A. Accordingly, the first and second fins 38a and 38b are alternately arranged at intervals of 90 degrees about the rod 37. Further, the first and second fins 38a and 38b are cross-shaped when viewing the guide 36 from the opening 32.

A first spring elevation seat 39 is formed on the inner bottom surface 35 of the retainer 31 near the guide 36 so as not to interfere with the guide 36. The first spring elevation seat 39 includes first elevating pieces 39a and 39b, which are box-shaped and symmetric to each other relative to a center line of the inner bottom surface 35 that extends in the vertical direction of the opening 32. Accordingly, the first elevating pieces 39a and 39b are formed on opposite sides of one of the second fins 38b. The first elevating pieces 39a and 39b are arranged to extend toward the center of the guide 36 (rod 37) so that their extensions are orthogonal to each other.

Referring to FIG. 3, the shutter 41 is accommodated in the retainer 31 and supported in a manner enabling reciprocating movement. The shutter 41 includes a surface 42 on which four semi-spherical projections 43 are formed. The projected height, size, and arrangement of the projections 43 are determined so that when the portable device 2 is inserted in the slot device 10, the portable device 2 does not come into contact with the surface 42 of the shutter 41. This prevents the surface 42 of the shutter 41 from being damaged during insertion of the portable device 2 into the slot device 10.

Referring to FIG. 4C, a cylindrical spring receptacle 44 projects from the rear surface of the shutter 41. The spring receptacle 44 includes an inner bottom surface 45 (rear surface of the shutter 41) on which a second spring elevation seat 46 is formed. The second spring elevation seat 46 includes second elevating pieces 46a and 46b, which are box-shaped and symmetric to each other relative to a center line of the inner bottom surface 45 in the spring receptacle 44 extending in the vertical direction of the opening 32. Further, the second elevating pieces 46a and 46b are arranged to extend from an inner circumferential surface 47 of the spring receptacle 44 toward the center of the inner bottom surface 45 so that their extensions are orthogonal to each other. The second elevating pieces 46a and 46b are arranged to be opposite to the first elevating pieces 39a and 39b when viewed from the opening 32 of the slot device 10 (refer to FIG. 4A). Thus, the second elevating pieces 46a and 46b are arranged so that they do not face toward the first elevating pieces 39a and 39b. The projecting height of the first elevating pieces 39a and 39b from the inner bottom surface 35 of the retainer 31 and the projected height of the second elevating pieces 46a and 46b from the inner bottom surface 45 of the spring receptacle 44 are set to be greater than the coil diameter of the coil spring 51 (refer to FIG. 4D).

As shown in FIG. 3, the coil spring 51 is arranged between the inner bottom surface 35 of the retainer 31 and the inner bottom surface 45 of the spring receptacle 44. The coil spring 51 constantly urges the shutter 41 in a direction closing the opening 32 of the retainer 31. Thus, when the portable device 2 is not inserted in the slot device 10, the shutter 41 closes the opening 32. This prevents dust from entering the slot device 10 (more specifically, the retainer 31).

Referring to FIG. 4A, one end of the coil spring 51 has an elliptic profile. The elliptic end of the coil spring 51 is fitted to the guide 36. The inner circumferential surface 52 of the coil spring 51 at the elliptic end contacts the distal ends of the first fins 38a and the second fins 38b. If the coil spring 51 were to be rotated about its axis, the support 38 (especially, the first fins 38a) would extend into the rotation path 60 of the elliptic end. This restricts the rotation of the coil spring 51. More specifically, if the coil spring 51 were to be rotated, the elliptic end would follow the rotation path 60 as shown by the dotted annular portion in FIG. 4B. However, the second fins 38b of the support 38 extend into the rotation path. Thus, the second fins 38b function as a rotational resistance that restricts rotation of the coil spring 51.

Referring to FIG. 4D, the portion of the coil spring 51 at which the winding of the coil starts, or the wind initiation portion 53, is arranged to contact the first spring elevation seat 39. The first spring elevation seat 39 supports the wind initiation portion 53 in a state inclined relative to the inner bottom surface 35 of the retainer 31. In other words, the elliptic end of the coil spring 51 (more accurately, the wind initiation portion 53) is arranged to extend from the first spring elevation seat 39 to the inner bottom surface 35 of the retainer 31. This inclines the coil spring 51 relative to the inner bottom surface 35. Since the rotation of the coil spring 51 is restricted, the wind initiation portion 53 is always held in a state contacting the first spring elevation seat 39. Thus, the elevating pieces 39a and 39b of the first spring elevation seat 39 hold the wind initiation portion 53 of the coil spring 51 in a state inclined relative to the inner bottom surface 35 of the retainer 31.

Except for the elliptic end, the other portions of the coil spring have a round profile. The other end of the coil spring 51 is received in the spring receptacle 44. In this state, the portion of the coil spring 51 at which the winding of the coil ends, or the wind termination portion 54, is arranged to contact the second spring elevation seat 46. The second spring elevation seat 46 supports the wind termination portion 54 in a state inclined relative to the inner bottom surface 45 of the spring receptacle 44. In other words, the end of the coil spring 51 opposite to the elliptic end (more accurately, the wind termination portion 54) is arranged to extend from the second spring elevation seat 46 to the inner bottom surface 45 of the spring receptacle 44.

The first spring elevation seat 39 and the second spring elevation seat 46 are arranged opposite to each other when viewed from the opening 32 of the slot device 10 (refer to FIG. 4A). Thus, the two ends of the coil spring 51 are inclined in opposite directions. This bends the entire coil spring 51 in an S-shaped manner (refer to FIG. 3). Thus, the outer circumferential surface 55 of the coil spring 51 applies a strong force to the inner circumferential surface 47 of the spring receptacle 44 regardless of whether or not the shutter 41 is closed. Further, contact between the coil spring 51 and the inner circumferential surface 47 reduces the portion of the coil spring 51 that is in a free state in comparison to when one or both of the first spring elevation seat 39 and the second spring elevation seat 46 are not provided. To enable bending of the coil spring 51, the inner diameter of the spring receptacle 44 is slightly greater than the diameter of the coil spring 51. Further, the size of the coil spring 51 is determined such that it contacts the inner circumferential surface 47 of the spring receptacle 44 when bent in an S-shaped manner.

The state of the slot device 10 under different circumstances will now be discussed.

In a normal state when there is no battery drainage, communication is enabled through wireless signals between the portable device 2, which is held by the user, and the controller, which is installed in the vehicle. Thus, when communication is established and the starting of the engine is enabled, the user may start the engine just by operating a switch (not shown) arranged near the driver seat. In this case, the portable device 2 is not inserted in the slot device 10. Thus, the opening 32 of the slot device 10 is closed by the shutter 41 as shown in the state of FIG. 1.

When the vehicle is being driven, external vibrations may be transmitted to the slot device 10 due to the operation of a gearshift lever (especially, when located near the slot device 10) or when traveling along rough roads. However, the coil spring 51 is entirely bent to be S-shaped. Thus, the outer circumferential surface 55 of the coil spring 51 is in contact with and abuts against the inner circumferential surface 47 of the spring receptacle 44. This prevents the coil spring 51 from vibrating or producing noise even when external vibrations are transmitted to the coil spring 51 through the case 12 and retainer 31 of the slot device 10. Further, by bending the coil spring 51 to be S-shaped so that it contacts and abuts against the inner circumferential surface 47 of the spring receptacle 44, the portion of the coil spring 51 that is in a free state is decreased. This causes the coil spring 51 to further resist being vibrated and prevents noise from being produced.

When, for example, battery drainage occurs in the portable device 2, the user inserts the portable device 2 into the slot device 10. This activates the transponder 23 of the portable device 2 and enables communication between the portable device 2 and the controller installed in the vehicle.

Figure 5:
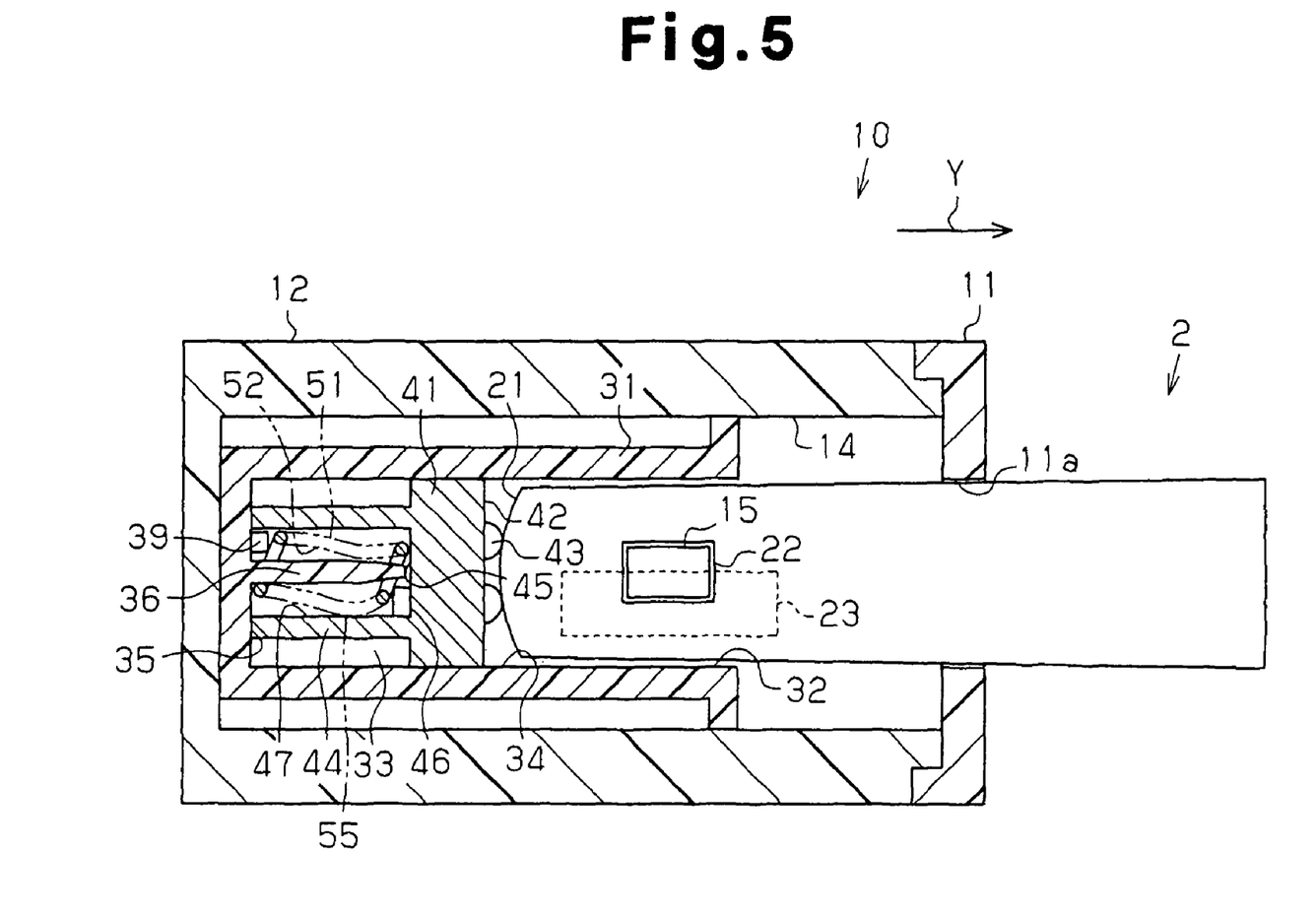
FIG. 5 is a cross-sectional view showing the portable device in a state inserted in the slot device.

As shown in the state of FIG. 5, when the portable device 2 is inserted in the slot device 10, the insertion surface 21 of the portable device 2 pushes the projections 43 of the shutter 41. This moves the shutter 41 toward the inner bottom surface 35 of the retainer 31 (in the direction indicated by arrow X in FIG. 3) against the urging force of the coil spring 51. The insertion of the shutter 41 into the retainer 31 compresses the coil spring 51 in a state in which the outer circumferential surface 55 of the coil spring 51 partially contacts the inner circumferential surface 47 of the spring receptacle 44. In this case, a strong force is not required to insert the portable device 2 into the slot device 10, whereas a strong force would be required when the spring force (urging force) of the coil spring 51 is increased to prevent vibrations of the coil spring 51.

When the spring receptacle 44 of the shutter 41 comes into contact with the inner bottom surface 35 and the shutter 41 is further pushed, the retainer 31 moves together with the portable device 2 and the shutter 41 into the case 12. As the bottom surface of the retainer 31 contacts the inner bottom surface of the case 12 and the portable device 2 reaches a position at which the engagement sockets 22 of the portable device 2 are aligned with the locking hooks 15 of the retainer 31, the locking hooks 15 project into the engagement sockets 22. This engages the locking hooks 15 with the engagement sockets 22 and locks the portable device 2 so that it does not fall out of the slot device 10 (more accurately, the retainer 31). More specifically, the urging force of the compressed coil spring 51 urges the shutter 41 in an outward direction. Thus, the portable device 2 restricts outward movement of the shutter 41. This keeps the coil spring 51 compressed.

When the user stops the engine and leaves the vehicle, the user removes the portable device 2 from the slot device 10 by pulling the portable device 2 in an outward direction (the direction indicated by arrow Y in FIG. 5). This releases the portable device 2 from the locking hooks 15. As a result, the urging force of the coil spring 51 outwardly moves the shutter 41 together with the portable device 2. This aids the removal of the portable device 2.

The outward movement of the shutter 41 expands the coil spring 51 in a state in which the outer circumferential surface 55 of the coil spring 51 partially contacts the inner circumferential surface 47 of the spring receptacle 44. Thus, as the shutter 41 returns to the position where it closes the opening 32 when the user removes the portable device 2 from the slot device 10, the coil spring 51 is prevented from vibrating and noise is not produced. In this case, the portable device 2 does not pop out of the slot device 10 when it is removed from the slot device 10, whereas the portable device 2 would pop out if the spring force (urging force) of the coil spring 51 were to be increased in order to prevent vibrations of the coil spring 51.

The outward movement of the shutter 41 is restricted when the shutter 41 abuts against the stopper (not shown), which is arranged on the case 12. The stopper also holds the shutter 41 at the position where the shutter 41 closes the opening 32. Vibrations produced when the shutter 41 abuts against the stopper may be transmitted to the coil spring 51. However, since the outer circumferential surface 55 of the coil spring 51 partially contacts and abuts against the inner circumferential surface of the spring receptacle 44, the coil spring 51 is prevented from vibrating even when the shutter 41 is located at the position where it closes the opening 32.

In the preferred embodiment, the end of the coil spring 51 fitted to the guide 36 has an elliptic profile. This prevents the coil spring 51 from rotating relative to the guide 36. Thus, the coil spring 51 is constantly held so that the wind initiation portion 53 and the wind termination portion 54 respectively contact the first spring elevation seat 39 and the second spring elevation seat 46. In other words, the coil spring 51 is held so that its two ends are constantly inclined with respect to the inner bottom surface 35 of the retainer 31 and the inner bottom surface 45 of the spring receptacle 44. This maintains a satisfactory state of contact between the coil spring 51 and the inner circumferential surface 47 of the spring receptacle 44.

If rotation of the coil spring 51 relative to the guide 36 were not restricted, rotation of the coil spring 51 would separate the wind initiation portion 53 and the wind termination portion 54 from the first spring elevation seat 39 and the second spring elevation seat 46. This would make it difficult to maintain constant inclination of the two ends of the coil spring 51 relative to the corresponding inner bottom surfaces 35 and 45. If the wind initiation portion 53 and the wind termination portion 54 were to be separated from the first spring elevation seat 39 and the second spring elevation seat 46, the inclination of the coil spring 51 relative to the two inner bottom surfaces 35 and 45 would be smaller than when the wind initiation and termination portions 53 and 54 are held at the positions corresponding to the first and second spring elevation seats 39 and 46. This would reduce the force applied to the inner circumferential surface 47 of the spring receptacle 44 by the outer circumferential surface 55 of the coil spring 51 and lower the effect for suppressing vibrations of the coil spring 51 and the generation of noise resulting from such vibrations.

Further, in the preferred embodiment, grease or the like is not applied to the coil spring 51. This avoids grease sticking to the portable device 2 when the portable device 2 is inserted in the slot device 10. Thus, the portable device 2 would not slip in the user's hand due to grease when pulling the portable device 2 out from the slot device 10. Further, a situation in which the portable device 2 removed from the slot device 10 stains a clothing pocket or bag with grease is avoided.

The preferred embodiment has the advantages described below.

(1) The first spring elevation seat 39 and the second spring elevation seat 46 respectively project from the inner bottom surface 35 of the retainer 31 and the inner bottom surface 45 of the spring receptacle 44. Further, the ends of the coil spring 51 (i.e., the wind initiation portion 53 and the wind termination portion 54) are arranged on the first spring elevation seat 39 and the second spring elevation seat 46 so as to incline the coil spring 51. As a result, the outer circumferential surface 55 of the coil spring 51 contacts and abuts against the inner circumferential surface 47 of the spring receptacle 44. This prevents external vibrations from causing vibrations of the coil spring 51 and producing noise. Further, to prevent vibrations and noise, there is no need to increase the spring force (urging force) of the coil spring 51 or apply grease to the coil spring 51.

(2) When viewed from the opening 32 of the retainer 31, the first spring elevation seat 39 and the second spring elevation seat 46 are arranged opposite to each other. This inclines the two ends of the coil spring 51 in opposite directions and bends the entire coil spring 51 in an S-shaped manner. Thus, when the retainer 31 is closed, the outer circumferential surface 55 of the coil spring 51 strongly applies pressure to the inner circumferential surface 47 of the spring receptacle 44. This further prevents vibrations of the coil spring 51 and the production of noise.

(3) One end (wind initiation portion 53) of the coil spring 51 does not rotate relative to the guide 36. The portions of the coil spring 51 at which the winding of the coil starts and terminates are not separated from the first spring elevation seat 39 and the second spring elevation seat 46, respectively. This keeps the inclination of the end of the coil spring 51 (wind termination portion 54) relative to the inner bottom surface 35 of the retainer 31 constant. Thus, use of the coil spring 51 is preferred for having the end portions (wind initiation portion 53 and wind termination portion 54) held on the first spring elevation seat 39 and the second spring elevation seat 46 to keep the end portions of the coil spring 51 inclined relative to the corresponding inner bottom surfaces 35 and 45. If the end portions were not fixed, the end portions of the coil spring 51 would rotate and fall off the first spring elevation seat 39 and the second spring elevation seat 46. Then, the end portions would abut against the sides of the first spring elevation seat 39 and the second spring elevation seat 46. This would decrease the inclination of the coil spring 51 and lower the pressure applied to the inner circumferential surface 47 of the spring receptacle 44 by the outer circumferential surface 55 of the coil spring 51. In this case, the effect of reducing vibrations of the coil spring 51 and preventing noise caused by such vibrations would be lowered. In the present invention, however, the end portion of the coil spring 51 is fixed. This constantly keeps the coil spring 51 arranged at the optimal position at which the inclination is maximal so that the force applied to the spring receptacle 44 by the coil spring 51 remains constant.

(4) When rotational force is applied to the wind initiation portion 53 of the coil spring 51, the inner circumferential surface 52 of the wind initiation portion 53 is held by the support 38 of the guide 36. This restricts rotation of the coil spring 51.

(5) If the coil spring 51 was rotated, the elliptic end of the coil spring 51 would follow the rotation path as shown by the dotted annular portion in FIG. 4B. However, the first fins 38a of the support 38 extend into the rotation path. Thus, when a rotational force acts on the coil spring 51, the second fins 38b function as a rotational resistance that restricts rotation of the coil spring 51.

(6) The heights of the first elevating pieces 39a and 39b and the second elevating pieces 46a and 46b are greater than the coil diameter of the coil spring 51. Thus, when the wind initiation portion 53 and the wind termination portion 54 of the coil spring 51 are not arranged on the first elevating pieces 39a and 39b and the second elevating pieces 46a and 46b, as shown by the broken lines in FIG. 4D, the coil spring 51 would still be inclined. This would cause the outer circumferential surface 55 of the coil spring 51 contact the inner circumferential surface 47 of the spring receptacle 44.

It should be apparent to those skilled in the art that the present invention may be embodied in many other specific forms without departing from the spirit or scope of the invention. Particularly, it should be understood that the present invention may be embodied in the following forms.

As long as the end portion of the coil spring 51 held by the support 38 does not have the profile of a circle, which would result in the coil spring 51 easily rotating, the coil spring 51 may have any elliptic or polygonal profile. For example, referring to FIG. 6A, a coil spring 51a may have an end portion with a rectangular profile. In this case, four fins 38c extend radially outward from the center of a rod 37. The four fins 38c have the same lengths and are arranged to form an X-shape when viewed from the opening 32 of the retainer 31. In this structure, the fins 38c contact the four corners of the coil spring 51a and restrict rotation of the coil spring 51a. Referring to FIG. 6B, a coil spring 51d may have an end portion with a triangular profile. In this case, three fins 38d extend radially outward from the center of a rod 37 at equal intervals. The three fins 38d have the same lengths. In this structure, the fins 38d contact the three corners of the coil spring 51d and restrict rotation of the coil spring 51d. Referring to FIG. 6C, the coil spring 51 having an end portion with an elliptic profile may be closely engaged with an elliptic rod 37c. This would restrict rotation of the coil spring 51. In the structures shown in FIGS. 6A to 6C, if the coil spring 51, 51a, and 51d were to be rotated, the fins 38c and 38d and the elliptic rod 37c would extend into the rotation path of the end portion of the corresponding coil springs 51, 51a, and 51d. Accordingly, coil spring rotation is restricted.

Figure 6A:
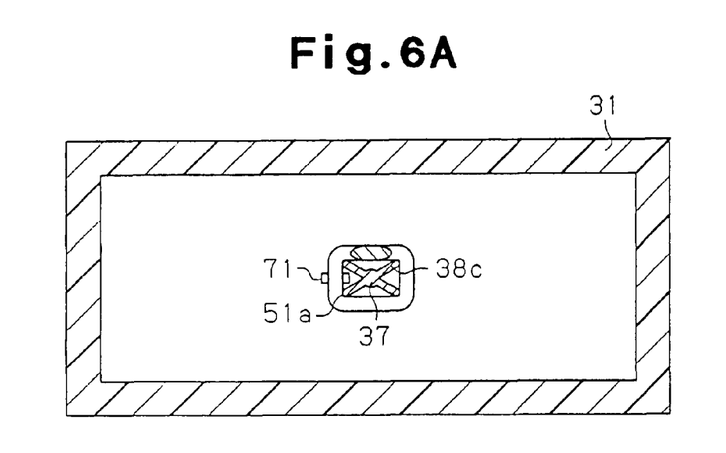
FIGS. 6A to 6C are cross-sectional views showing the shape of guides and the profile of coil springs in modifications of the preferred embodiment.
Figure 6B:
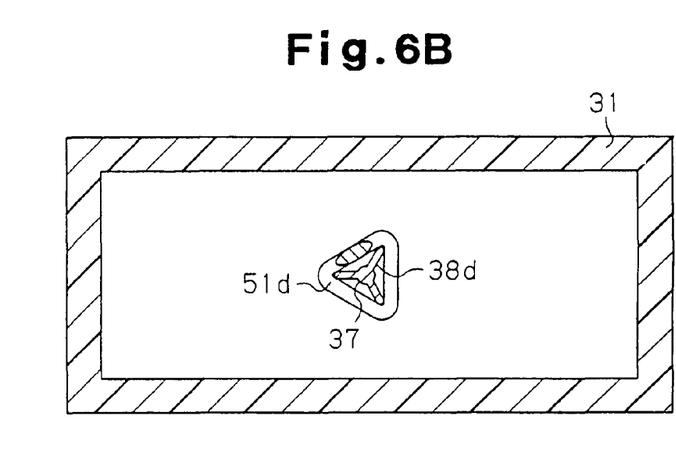
Figure 6C:
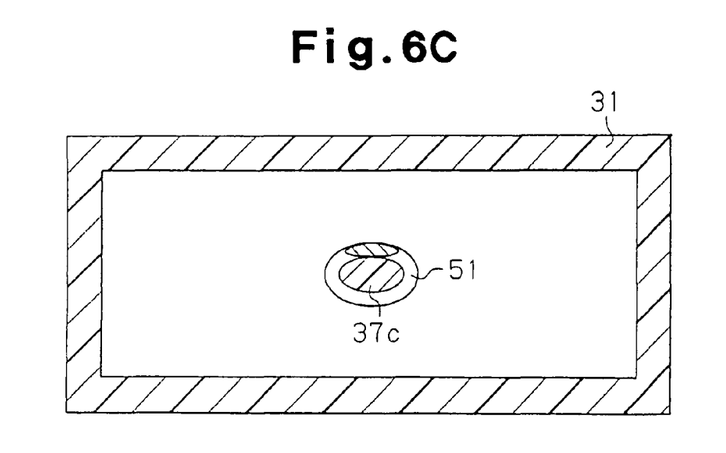
Figure 6D:
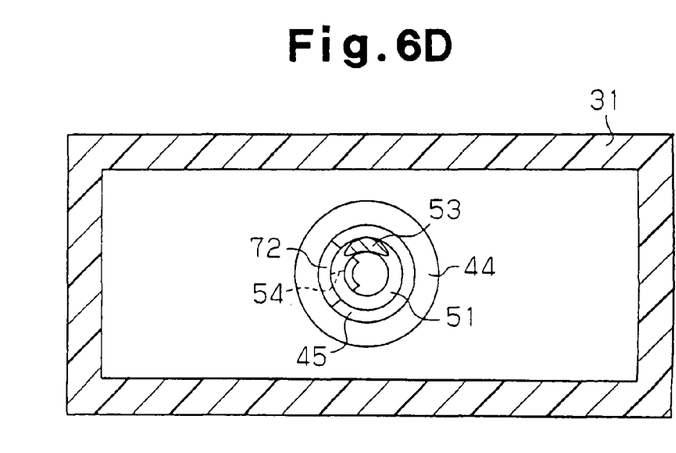
FIG. 6D is a cross-sectional view showing the shape of a spring seat in another modification of the preferred embodiment.

Referring to FIG. 6D, the second spring elevation seat 46, which is arranged on the inner bottom surface 45 of the spring receptacle 44, may be changed to a spring elevation seat 72 extending about the center of the spring receptacle 44 within an angular range of 180 degrees. This would facilitate the arrangement of the wind termination portion 54 on the spring elevation seat 72 and ensure the inclination of the coil spring 51. Further, the first spring elevation seat 39 that supports the wind initiation portion 53 may be identical to the spring elevation seat 72.

Referring to FIG. 6A, the first spring elevation seat 39 and the second spring elevation seat 46 may each include only one elevating piece 71.

In the preferred embodiment, the first spring elevation seat 39 and the second spring elevation seat 46 respectively include two first elevating pieces 39a and 39b and two elevating pieces 46a and 46b. However, the first spring elevation seat 39 and the second spring elevation seat 46 may include three or more elevating pieces. Further, the elevating pieces may be arranged at equal angular intervals in the circumferential direction about the rod 37 or the spring receptacle 44.

The first spring elevation seat 39 may be formed from three elevating pieces, while the second spring elevation seat 46 is formed from one elevating piece. In other words, elevating pieces may be formed integrally to form a single second spring elevation seat 46, while the first spring elevation seat 39 is formed from three elevating pieces.

In the preferred embodiment, the angular interval between the first elevating pieces 39a and 39b and between the second elevating pieces 46a and 46b is 90 degrees. However, the first elevating pieces 39a and 39b and the second elevating pieces 46a and 46b may be spaced from each other by any angular interval as long as it is 180 degrees or less.

One of the first spring elevation seat 39 and the second spring elevation seat 46 may be eliminated.

In the preferred embodiment, the two elevating pieces 39a and 39b of the first spring elevation seat 39 and the two elevating pieces 46a and 46b of the second spring elevation seat 46 are arranged extending toward the axis of the rod 37. However, the two elevating pieces 39a and 39b of the first spring elevation seat 39 and the two elevating pieces 46a and 46b of the second spring elevation seat 46 may be arranged at any angle.

The height of the first spring elevation seat 39 and the second spring elevation seat 46 may be less than the coil diameter of the coil spring 51. In such a case, the end portions of the coil spring 51 (i.e., the wind initiation portion 53 and the wind termination portion 54) may still be inclined so that the outer circumferential surface 55 of the coil spring 51 contacts the inner circumferential surface 47 of the spring receptacle 44.

The present examples and embodiments are to be considered as illustrative and not restrictive, and the invention is not to be limited to the details given herein, but may be modified within the scope and equivalence of the appended claims.

What is claimed is:

1. A slot device for holding a portable device, wherein the portable device is for performing predetermined communication with a controller installed in a vehicle and enabling activation of a drive source, the slot device comprising:
   a retainer for retaining the portable device, the retainer including an opening, through which the portable device is insertable, and an inner bottom surface;
   a shutter, movable in the retainer, for opening and closing the opening of the retainer;
   a guide arranged on the inner bottom surface of the retainer;
   a cylindrical spring receptacle arranged on the shutter facing toward the guide and including an open distal end, an inner bottom surface facing towards the inner bottom surface of the retainer, and an inner circumferential surface extending between the distal end and the inner bottom surface;
   a coil spring including an end supported by the guide and another end supported by the spring receptacle, the coil spring producing urging force for urging the inner bottom surface of the spring receptacle away from the inner bottom surface of the retainer, wherein insertion of the portable device into the retainer moves the shutter in the insertion direction of the portable device against the urging force of the coil spring, and removal of the portable device from the retainer causes the shutter to move to close the opening of the retainer due to the urging force of the coil spring; and
   a spring elevation seat arranged on either one of the inner bottom surface of the retainer and the inner bottom surface of the spring receptacle, wherein the spring elevation seat and the associated inner bottom surface on which the spring elevation seat is arranged supports the corresponding end of the coil spring so that the coil spring is inclined relative to the inner bottom surface on which the spring elevation seat is arranged and the coil spring contacts the inner circumferential surface of the spring receptacle.

2. The slot device according to claim 1, wherein the spring elevation seat is one of a first spring elevation seat arranged on the inner bottom surface of the retainer and a second elevation seat arranged on the inner bottom surface of the spring receptacle, the first spring elevation seat and the second spring elevation seat being arranged so as not to face toward each other.

3. The slot device according to claim 1, wherein the spring elevation seat extends about the axis of the coil spring within an angular range of 180 degrees.

4. The slot device according to claim 3, wherein the spring elevation seat includes a plurality of elevating pieces.

5. The slot device according to claim 1, wherein the end of the coil spring supported by the guide of the retainer is fitted to the guide, and the guide is shaped to restrict rotation of the coil spring.

6. The slot device according to claim 5, wherein the coil spring includes an inner circumferential surface, and the guide constantly contacts the inner circumferential surface of the coil spring to restrict rotation of the coil spring.

7. The slot device according to claim 6, wherein:
   the end of the coil spring supported by the guide of the retainer has a profile shaped so that distance from the axis of the coil spring continuously changes; and
   when hypothetically rotating the coil spring about its axis, the guide includes a portion extending into a rotation path formed by the corresponding end of the coil spring, in which the extending portion of the guide restricts rotation of the coil spring.

8. The slot device according to claim 7, wherein the end of the coil spring supported by the guide has an elliptic profile.

9. The slot device according to claim 8, wherein the guide includes:
   a rod arranged on the inner bottom surface of the retainer; and
   a support radially extending from the rod and constantly contacting the inner circumferential surface of the coil spring.

10. The slot device according to claim 9, wherein the support of the guide includes a plurality of fins for restricting rotation of the coil spring.

11. The slot device according to claim 6, wherein the end of the coil spring supported by the guide has a polygonal profile and includes a plurality of corners.

12. The slot device according to claim 11, wherein the guide includes:
   a rod arranged on the inner bottom surface of the retainer; and
   a support radially extending from the rod and constantly contacting the corners of the coil spring.

13. The slot device according to claim 12, wherein the support of the guide includes a plurality of fins for restricting rotation of the coil spring.

14. A slot device for holding a portable device, wherein the portable device is for performing predetermined communication with a controller installed in a vehicle and enabling activation of a drive source, the slot device comprising:
   a retainer for retaining the portable device, the retainer including an opening, through which the portable device is insertable, and an inner bottom surface;
   a shutter, movable in the retainer, for opening and closing the opening of the retainer;
   a guide arranged on the inner bottom surface of the retainer and including a plurality of fins;
   a cylindrical spring receptacle arranged on the shutter facing toward the guide and including an open distal end, an inner bottom surface facing towards the inner bottom surface of the retainer, and an inner circumferential surface extending between the distal end and the inner bottom surface;
   a coil spring including an end supported by the guide and another end supported by the spring receptacle, the fins of the guide being formed to restrict rotation of the coil spring, and the coil spring producing urging force for urging the inner bottom surface of the spring receptacle away from the inner bottom surface of the retainer, wherein insertion of the portable device into the retainer moves the shutter in the insertion direction of the portable device against the urging force of the coil spring, and removal of the portable device from the retainer causes the shutter to move to close the opening of the retainer due to the urging force of the coil spring; and a first spring elevation seat, arranged on the inner bottom surface of the retainer, for partially lifting the end of the coil spring supported by the guide; and a second spring elevation seat, arranged on the inner bottom surface of the spring receptacle, for partially lifting the end of the coil spring supported by the spring receptacle, wherein the first spring elevation seat and the second spring elevation seat incline the associated ends of the coil spring relative to the corresponding inner bottom surfaces so that the coil spring contacts the inner circumferential surface of the spring receptacle, and the first spring elevation seat and the second spring elevation seat are arranged so as not to face toward each other.

15. The slot device according to claim 14, wherein the end of the coil spring supported by the guide has an elliptic profile and is fitted on the fins of the guide so as to restrict rotation of the coil spring.

16. The slot device according to claim 14, wherein the end of the coil supported by the guide has a polygonal profile including a plurality of corners, wherein the corners are engaged with the fins of the guide so as to restrict rotation of the coil spring.

* * * * *